United States Patent
Igi et al.

(10) Patent No.: US 6,414,999 B1
(45) Date of Patent: Jul. 2, 2002

(54) EDITING METHOD AND EDITING APPARATUS

(75) Inventors: Nobuhiro Igi, Kanagawa; Koji Obata, Tokyo; Motoki Kato, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/315,668

(22) Filed: May 20, 1999

(30) Foreign Application Priority Data

May 22, 1998 (JP) .......................................... 10-141150

(51) Int. Cl.[7] ................................................ H04B 1/66
(52) U.S. Cl. ............. 375/240.26; 348/705; 375/240.12; 386/52
(58) Field of Search ...................... 375/240.26, 240.12; 386/52; 348/705

(56) References Cited

U.S. PATENT DOCUMENTS 5,822,024 A * 10/1998 Setogawa et al. ............. 386/52
5,917,988 A * 6/1999 Eto ............................. 386/52
6,046,971 A * 4/2000 Ogasawara ................... 386/52
6,285,361 B1 * 9/2001 Brewer et al. ................ 386/52

* cited by examiner

Primary Examiner—Howard Britton
(74) Attorney, Agent, or Firm—Frommer Lawrence & Haug LLP; William S. Frommer

(57) ABSTRACT

An edit point of an earlier GOP1 is placed after an I picture I22. In addition, the edit point is not placed immediately after an I or P picture. Thus, the GOP1 is decoded. A stream placed after the edit point (a P picture and later pictures) is discarded. B pictures B26 and B27 placed after a P picture P25 are re-encoded with a forward moving vector Fw. The remaining pictures other than B pictures B26 and B27 are re-encoded with encoding information used in a decoding process. Since an edit point of a later GOP2 is not placed before the I picture I2, the GOP2 is decoded. A stream placed before the edit point (pictures B0 to P5) is discarded. The first P picture P8 is changed to an I picture. Thereafter, the re-encoding process is performed. The P picture P8 changed from the I picture is used as a predictive reference picture. With the P picture P8, a backward moving vector Bk is obtained. With only the moving vector Bk, the B pictures B6 and B7 placed before the P picture P8 are re-encoded.

10 Claims, 10 Drawing Sheets

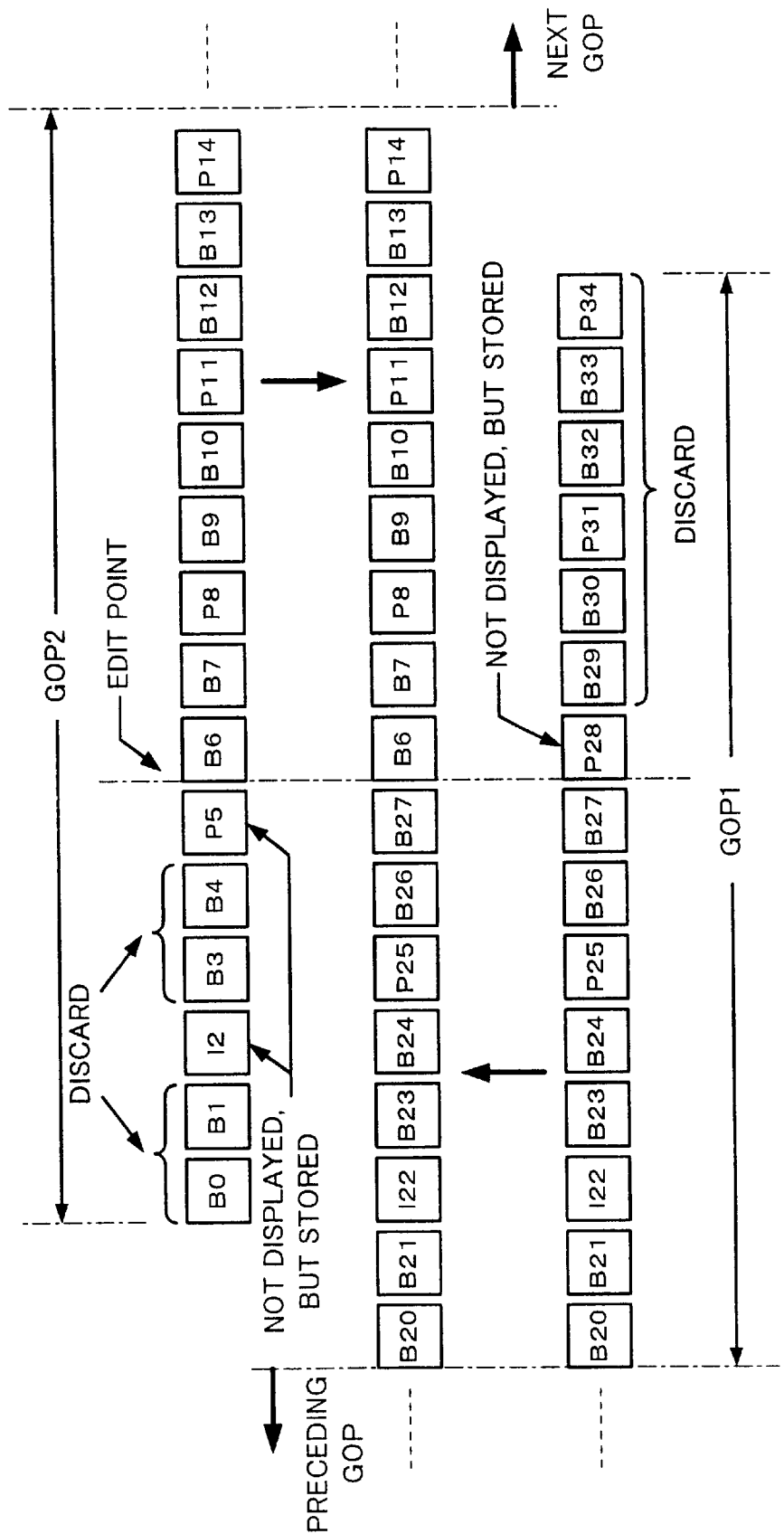

EDITING METHOD AND EDITING APPARATUS

BACKGROUND OF THE INVENTION

1. Field of the Invention

The present invention relates to an editing method and an editing apparatus for editing a picture signal that has been compression-encoded with for example MPEG method.

2. Description of the Related Art

In recent years, MPEG (Moving Picture Experts Group) method has been widely used as an inter-picture compression encoding method. With a compression-encoding method such as the MPEG method, a record medium can be effectively used. When a picture signal that has been encoded by the MPEG method is edited by an editing system, a decoded picture signal and an external picture signal are connected. The resultant signal is encoded with the MPEG method and then recorded on a record medium. When a video signal recorded on another record medium is dubbed by a recorder, a reproduction signal of the record medium is decoded and then re-encoded.

In the MPEG method, there are three picture types that are referred to as I, P, and B pictures. When an I picture (Intra-coded picture) is encoded, only information thereof is used. Thus, an I picture can be decoded with only information thereof. When a P picture (Predictive-coded picture) is encoded, as a predictive picture (a reference picture for obtaining a difference), an I picture and a P picture that have been decoded are used. The difference between the current P picture and a predictive picture that has been motion-compensated is encoded. Alternatively, the current P picture is encoded without obtaining the difference. One of these methods is selected for each macro block so that a higher effect is obtained. When a B picture (Bidirectionally predictive-coded picture) is encoded, three types of predictive pictures (reference pictures) are used. The first predictive picture is an I picture or a P picture that has been decoded before the current B picture. The second predictive picture is an I picture or a P picture that has been decoded after the current B picture. The third predictive picture is an interpolated picture created by the first predictive picture and the second predictive picture. The difference between the current B picture and each of the predictive pictures that have been motion-compensated is encoded. Alternatively, the current B picture is intra-encoded. One of the two methods is selected for each macro block so that a higher effect is obtained.

Thus, there are four macro block types that are an intra-frame encoded macro blocks, forward inter-frame predictive macro blocks (for predicting a future macro block with a past macro block), backward inter-frame macro blocks (for predicting a past macro block with a future macro block), and bidirectional macro blocks (for predicting a current macro block with both a future macro block and a past macro block). An I picture contains only intra-frame encoded macro blocks. A P picture contains inter-frame encoded macro blocks and forward inter-frame predictive macro blocks. A B picture contains all four types of macro blocks.

In the MPEG method, a GOP (Group Of Pictures) structure that is a group of a plurality of pictures has been defined so as to perform a random-access operation. In the MPEG method, it is defined that the first picture of a GOP should be an I picture and that the last picture thereof should be an I picture or a P picture. Moreover, in the MPEG method, it is also defined that a structure for requiring a prediction with the last I or P picture of the preceding GOP is permitted. A GOP that can be decoded without need to use the preceding GOP is referred to as closed GOP. When edited results of pictures should be accurate, the closed GOP structure is often used.

In the MPEG method, since pictures are encoded with a frame correlation of each GOP, when an MPEG bit stream is edited, there is a restriction. In other words, when an end of a closed GOP matches an edit point, no problem takes place. However, the length of one GOP is normally 0.5 seconds that is too long as an edit point. Thus, it is preferable to edit a stream in an accuracy of one frame (picture).

When one of two MPEG video streams is switched over to the other at an edit point placed at a frame, phases of two streams connected are unknown. In the case of a GPO that completely stores a GOP structure without an edit point, pictures can be directly decoded without need to perform the edit point process.

When a GOP structure is not stored due to a presence of an edit point, a problem will take place. In a stream placed before an edit point, data placed after the edit point of the GOP is discarded. In a stream placed after an edit point, data placed before the edit point is discarded. When the remaining two streams with the edit point are decoded, data in the vicinity of the edit point of the two streams is treated as a new GOP. Thus, when the new GOP does not contain an I picture as a predictive reference picture, the GOP cannot be decoded. In this case, to allow the edited bit stream to be decoded, the bit stream is MPEG-decoded to a base band signal and then re-encoded to a bit stream.

The picture type of the first picture of the new GOP is changed to an I picture. With reference to the I picture, the picture type of another picture can be defined. In other words, when a non-edited GOP is decoded. The picture type of the first picture of the GOP is changed to an I picture. With the I picture, the picture type of another picture is re-defined and re-encoded. Consequently, a new GOP is formed.

However, in such an edit point processing method, depending on the phase of an edit point, a B picture may be changed to an I picture. Generally, although the data amount of a B picture is smaller than that of an I picture, the picture quality of the decoded picture of the former is lower than that of the latter. Thus, in the re-encoding process of which a deteriorated picture is used as an I picture, the picture quality of the re-encoded picture is inferior to the picture quality of the original picture.

In addition, since the sequence of the picture types of re-encoded stream is different from that of the original stream, encoding information used in the decoding process of the original stream cannot be used. Generally, whenever an editing process including a switching operation is performed, the encoding process and decoding process are repeated. Normally, when the decoding process and the encoding process are performed between a base band signal and a bit stream, picture quality of the resultant pictures largely deteriorates. With encoding information obtained in the decoding process of a stream, deterioration of picture quality in the vicinity of an edit point due to a decoding process and an encoding process can be minimized. The encoding information contains picture type, moving vector, and quantizing scale. When the picture type before the editing process is performed varis from the picture type after the editing process is performed, the encoding information cannot be used for the re-encoding process. Thus, the picture quality largely deteriorates.

OBJECTS AND SUMMARY OF THE INVENTION

Therefore, an object of the present invention is to provide an editing method and an editing apparatus that suppress picture quality from deteriorating in the case that encoded data (stream) is edited.

A first aspect of the present invention is a picture editing apparatus, comprising a designating means for designating an edit point, a controlling means for causing a picture encoded as a predictive reference picture at least before the picture is edited to be encoded as a predictive reference picture after the picture is edited, and a changing means for changing a predictive structure for a picture that is not the predictive reference picture placed before or after the edit point under the control of said controlling means.

A second aspect of the present invention is a picture editing method, comprising the steps of (a) designating an edit point, (b) causing a picture encoded as a predictive reference picture at least before the picture is edited to be encoded as a predictive reference picture after the picture is edited, and (c) changing a predictive structure for a picture that is not the predictive reference picture placed before or after the edit point under the control of step (b).

Before and after an editing process is performed, the interval of predictive reference pictures of encoded data is not varied. Thus, when a decoding process and a re-encoding process are performed, the number of calculations can be decreased. In addition, encoding information used in the decoding process can be re-used. Thus, the picture quality of pictures that have been edited can be improved.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 11 is a timing chart for explaining the edit point processing method in the combination of the present invention.

DETAILED DESCRIPTION OF THE PREFERRED EMBODIMENTS

Figure 1:
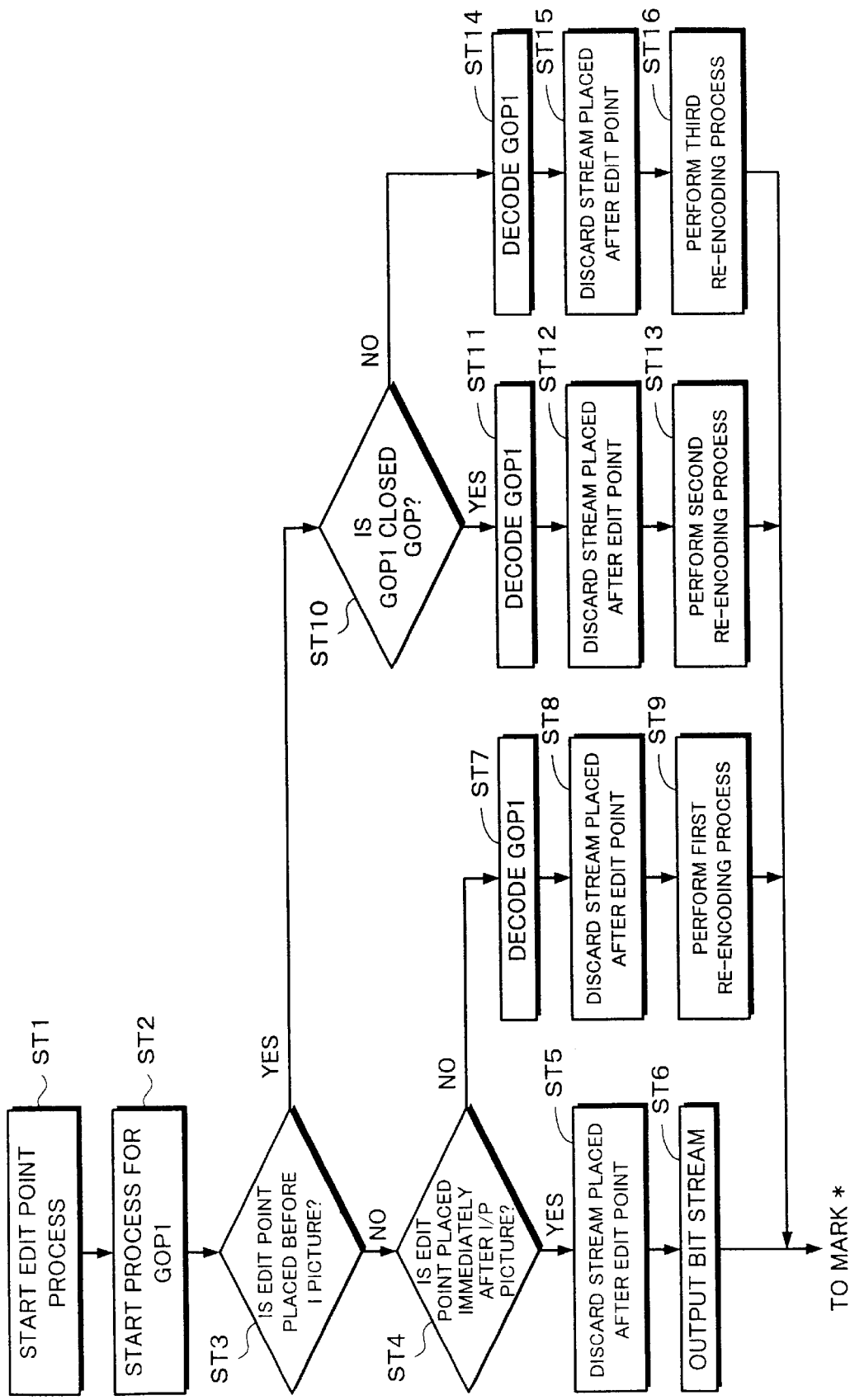
FIG. 1 is a first part of a flow chart for explaining a edit point processing method according to an embodiment of the present invention.
Figure 2:
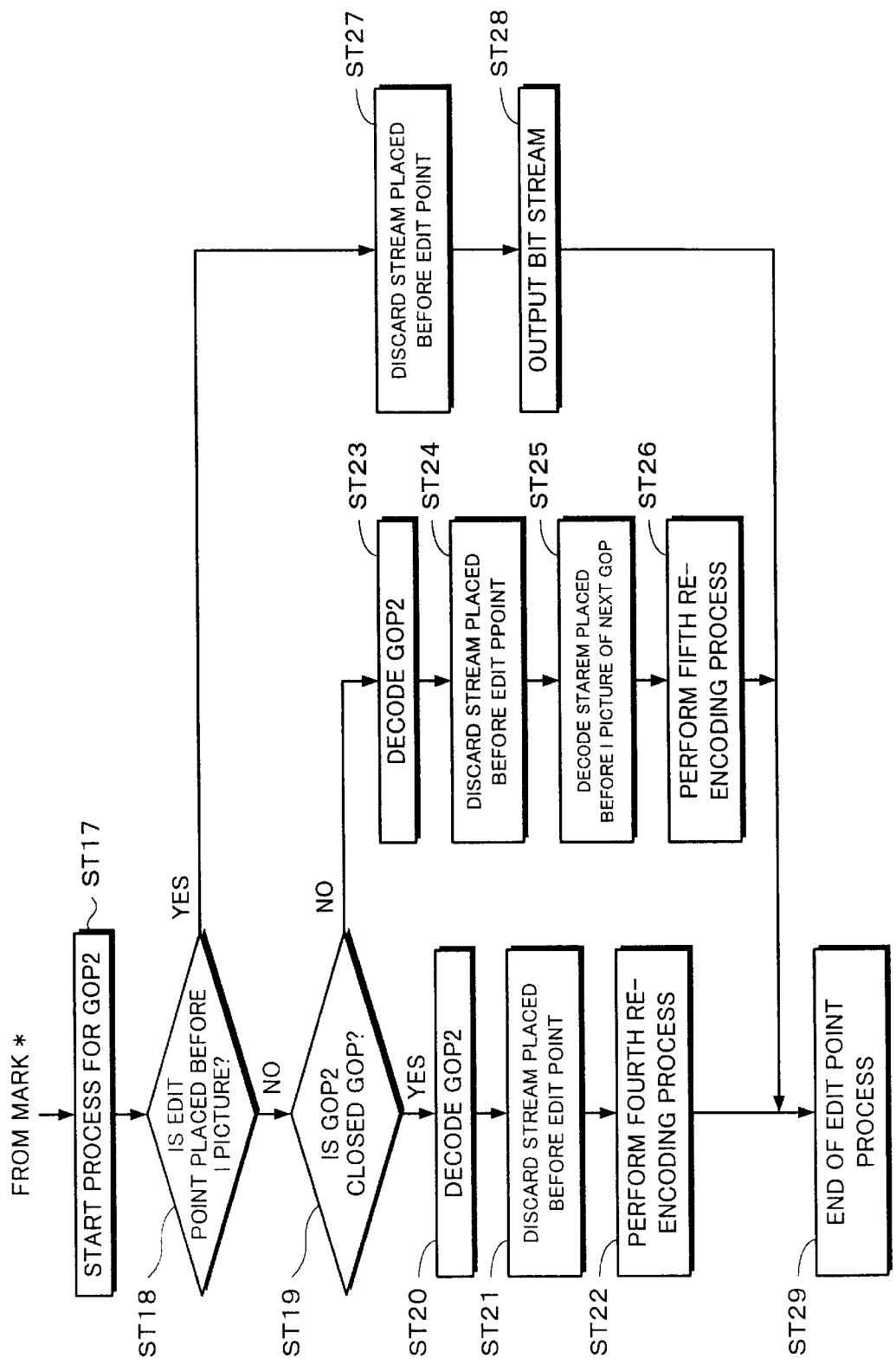
FIG. 2 is a second part of the flow chart shown in FIG. 1.

Next, with reference to the accompanying drawings, an embodiment of the present invention will be described. FIGS. 1 and 2 are a first part and a second part of a flow chart showing an edit point processing method according to the embodiment of the present invention. At step ST1, the edit point process is started. At step ST2, the process for a GOP (GOP1) containing an edit point (out point) of an earlier one of two bit streams to be connected is started. The edit point process is not performed for GOPs before the GOP1.

At step ST3, it is determined whether the edit point is placed before an I picture in the GOP1. When the determined result at step ST3 is No (namely, the edit point is placed after an I picture), the flow advances to step ST4. At step ST4, it is determined whether or not the edit point is placed immediately after an I picture or a P picture. When the determined result at step ST4 is Yes (namely, the edit point is placed immediately after an I picture or a P picture), the flow advances to step ST5. At step ST5, the bit stream placed after the edit point is discarded. Thereafter, the flow advances to step ST6. At step ST6, the remaining portion of the GOP1 is output as it is. In other words, since the stream placed before the edit point contains an I picture or a P picture that is a predictive reference picture, this portion of the stream can be decoded without need to perform a special process.

When the determined result at step ST4 is No (namely, the edit point is not placed immediately after a I picture or a P picture), the flow advances to step ST7. At step ST7, the GOP1 is temporarily decoded. At step ST8, pictures placed after the edit point are discarded. At step ST9, a first re-encoding process is performed. In the first re-encoding process, a B picture placed between an I picture or a P picture and the edit point is re-encoded with only a forward moving vector Fw of which an I picture or a P picture is a predictive reference picture.

As described above, a B picture contains a intra-frame encoded macro block, a forward inter-frame predictive macro block (for predicting a future macro block with a past macro block), a backward inter-frame predictive macro block (for predicting a past macro block with a future macro block), and a bidirectional macro block (for predicting a current macro block with a future macro block and a past macro block). Thus, in the case that a forward inter-frame predictive macro block and a bidirectional macro block, when a re-encoding process is performed with only a forward moving vector Fw, a moving vector Fw used in the decoding process can be re-used. On the other hand, in the case of a backward inter-frame predictive macro block, a forward moving vector Fw should be re-calculated.

The macro block type can be detected corresponding to a moving vector for each macro block. A macro block that does not have a moving vector is an intra-frame encoded macro block. A macro block that has only a forward moving vector is a forward inter-frame predictive macro block. A macro block that has only a backward moving vector is a backward inter-frame predictive macro block. A macro block that has both a forward moving vector and a backward moving vector is a bidirectional macro block. As well as a moving vector, the macro block type can be directly detected with information placed in a stream.

When the determined result at step ST3 is Yes (namely, the edit point is placed before an I picture), if the stream placed after the edit point is discarded, an I picture does not remain. Thus, the GOP1 is temporarily decoded and pictures placed after the edit point are discarded. The resultant pictures are re-encoded. The re-encoding process depends on whether or not the GOP1 (a bit stream containing the GOP1) is a closed GOP. Thus, at step ST10, it is determined whether or not the GOP1 is a closed GOP. A GOP header in the stream contains a closed GOP flag that has been set in the encoding process. Thus, it is determined whether or not the GOP1 is a closed GOP corresponding to the flag. When the flag represents a closed GOP, a plurality of B pictures at the beginning of the current GOP do not depend on the preceding GOP.

When the determined result at step ST10 is Yes (namely, the GOP1 is a closed GOP), the flow advances to step ST11. At step ST11, the GOP1 is temporarily decoded. At step ST12, pictures placed after the edit point are discarded. At step ST13, a second re-encoding process is performed. In the second re-encoding process, the first B picture is changed to an I picture. Thereafter, the re-encoding process is performed. When there is another B picture, it is used as a predictive reference picture (I picture). With only a forward moving vector Fw, the other B picture is re-encoded. The forward moving vector Fw is obtained from a decoded picture.

When the determined result at step ST10 is No (namely, the GOP1 is not a closed GOP), the flow advances to step ST14. At step ST14, the GOP1 is decoded. At step ST15, pictures placed after the edit point are discarded. At step ST16, a third re-encoding process is performed. In other words, since the GOP1 is not a closed GOP, the last P picture of the immediately preceding GOP is used as a predictive reference picture. With only a forward moving vector Fw, a B picture is encoded. As the forward moving vector Fw, a forward moving vector used in the decoding process can be re-used.

Thereafter, the flow advances to step ST17 (see FIG. 2). At step ST17, the process for a GOP (GOP2) containing an edit point (in point) of a later one of two streams to be connected is started. GOPs placed after the GOP2 are directly output as a bit stream without need to perform a special process.

At step ST18, it is determined whether or not an edit point is placed before an I picture. When the determined result at step ST18 is No (namely, the edit point is placed after an I picture), if the stream placed before the edit point is discarded, an I picture is lost. Thus, the GOP2 is temporarily decoded. Thereafter, the stream placed before the edit point is discarded and then the remaining stream is re-encoded. At step ST19, as with the case for the GOP1, it is determined whether or not the GOP2 is a closed GOP. The re-encoding process depends on whether or not the GOP2 is a closed GOP.

When the determined result at step ST19 is Yes (namely, the GOP2 is a closed GOP), the flow advances to step ST20. At step ST20, the GOP2 is decoded. At step ST21, the stream placed before the edit point is discarded. At step ST22, a fourth re-encoding process is performed. In the fourth re-encoding process, the first P picture is changed to an I picture. Thereafter, the re-encoding process is performed. When there is a B picture placed between the P picture and the edit point, the P picture is used as a predictive reference picture. With only a backward prediction (namely, a backward moving vector Bk), the re-encoding process is performed. The stream placed after the P picture is re-encoded without changing picture types. Thus, a P picture is changed to an I picture. With encoding information used in the decoding process at step ST20 (for example, with a moving vector), the re-encoding process is performed. The re-encoded stream is output. At step ST29, the edit point process is completed.

When the determined result at step ST19 is No (namely, the GOP2 is not a closed GOP), the flow advances to step ST23. At step ST23, the GOP2 is decoded. At step ST24, the stream placed before the edit point is discarded. At step ST25, the portion placed before an I picture of the next GOP is decoded. At step ST26, a fifth re-encoding process is performed.

As with the fourth re-encoding process, in the fifth re-encoding process at step ST26, the first P picture is changed to an I picture. Thereafter, the re-encoding process is performed. Pictures placed after the first P picture are re-encoded without changing their picture types. A B picture is re-encoded in a different manner from the fourth re-encoding process. In other words, with the last P picture of the GOP2 and an I picture of the next GOP, a B picture placed before the I picture is re-encoded and output. To re-encode the B picture, the forward moving vector and the backward moving vector used in the decoding processes at steps ST23 and ST25 can be used. The re-encoded stream is output. At step ST29, the edit point process is completed.

When the determined result at step ST18 is Yes (namely, the edit point is placed before an I picture), the flow advances to step ST27. At step ST27, the bit stream placed before the edit point is discarded. In the resultant bit stream, an I picture remains. At step ST28, the remaining bit stream of the GOP2 is output. At step ST29, the edit point process is completed.

Figure 3:
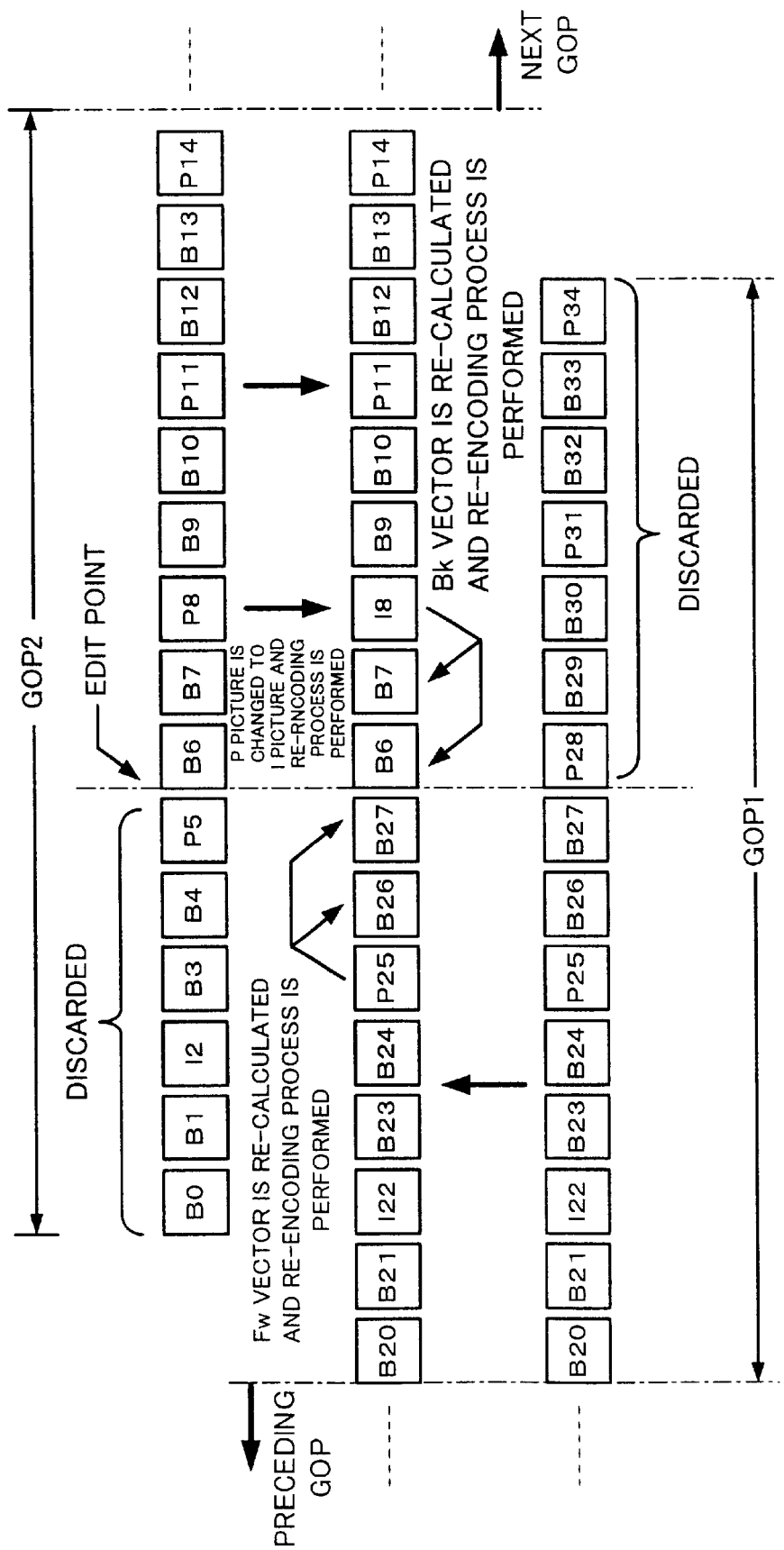
FIG. 3 is a timing chart for explaining the edit point processing method according to the embodiment of the present invention.

Next, with reference to FIG. 3, the edit point process shown in FIGS. 1 and 2 will be described in detail. FIG. 3 shows the case that a GOP1 in an earlier stream and a GOP2 in a later stream are switched over at edit points of the GOP1 and the GOP2. The number of pictures of each of the GOP1 and GOP2 is 15 (N=15). The interval of predictive reference pictures (I or P pictures) is 3 (M=3). In this example, the case that the GOP1 and GOP2 are closed GOPs will be described. However, regardless whether or not the GOP1 and GOP2 are closed GOPs, the similar process is performed except for the re-encoding process. The sequence of pictures shown in FIG. 3 matches the sequence of reproduced pictures. The sequence of reproduced pictures matches the sequence of original pictures and the sequence of decoded pictures.

First of all, the edit point process is performed for the GOP1. Since an edit point is placed after an I picture (I22) and is not placed immediately after an I picture or a P picture, the GOP1 is decoded at step ST7 through determinations at steps ST3 and ST4. Encoding information used in the decoding process is stored. The encoding information to be stored is picture type (mandatory), moving vector, and quantizing scale for each picture.

At step ST8, the stream placed after the edit point (a P picture P28 and later pictures) is discarded. Thereafter, at step ST9, the first re-encoding process is performed. In other words, B pictures B26 and B27 placed after a P picture P25 are re-encoded with only a forward moving vector Fw. As the forward moving vector Fw, a forward moving vector that has been stored in the decoding process or a forward moving vector that has been obtained in a re-calculating process is selected corresponding to a macro block type. The remaining pictures of the GOP1 other than B pictures B26 and B27 are re-encoded with the encoding information used in the decoding process at step ST7.

Each of the B pictures B26 and B27 contains an intra-frame encoded macro block, a forward inter-frame predictive macro block (for predicting a future macro block with a past macro block), a backward inter-frame predictive macro block (for predicting a past macro block with a future macro block), and a bidirectional macro block (for predicting a current macro block with a past macro block and a future macro block). Thus, in the case of a forward inter-frame predictive macro block and a bidirectional macro block, when a decoding process is performed with only a forward moving vector Fw, a moving vector Fw used in the decoding process can be re-used. On the other hand, in the case of a backward inter-frame predictive macro block, a forward moving vector Fw should be re-calculated.

Thereafter, the process for the GOP2 (B0 to P14) that is placed after the GOP1 is started. Since an edit point of the GOP2 is not placed before an I picture I2, if the stream placed before the edit point is discarded, the I picture I2 is lost. To prevent that, the GOP2 is decoded and the stream placed before the edit point (pictures B0 to P5) is discarded at steps ST18, ST19, ST20, and ST21. Next, at step ST22, the fourth re-encoding process is performed. In other words, the first P picture P8 is changed to an I picture. Thereafter, the re-encoding process is performed. The other pictures are re-encoded without changing the picture types. The P picture P8 changed to an I picture is used as a predictive reference picture so as to obtain a backward moving vector Bk. With the backward moving vector Bk, the B pictures B6 and B7 placed before the P picture P8 are re-encoded.

As with the case of the B pictures B26 and B27, in the case of a backward inter-frame predictive macro block and a bidirectional macro block of each of the B pictures B6 and B7, a moving vector Bk used in the decoding process can be re-used. On the other hand, in the case of a forward inter-frame predictive macro block, a backward moving vector Bk should be re-calculated.

Next, with reference to FIG. 4, a process for decoding the edited bit stream as shown in FIG. 3 and re-encoding the decoded bit stream will be described. In the picture sequence changing process of the MPEG encoder, as shown in FIG. 4, the sequence of the edited bit stream is changed so that I pictures and P pictures are first encoded and then B pictures are encoded.

In the stream placed before the edit point of the GOP1, the I picture I22 is used as a predictive reference picture. With a forward prediction using the I picture, the P picture P25 is encoded. Next, the I picture I22 is used as a predictive reference picture. With a backward prediction using the I picture I22, B pictures B20 and B21 are encoded. When the B pictures B20 and B21 are encoded, only a backward vector Bk corresponding to the I picture I22 is used. In addition, the I picture I22 and the P picture P25 are used as predictive reference pictures. With the I picture I22 and the P picture P25, B pictures B23 and B24 are encoded. When the B pictures B23 and B24 are encoded, both a forward moving vector Fw and a backward moving vector Bk are used. In addition, with the P picture P25 as a predictive reference picture, B pictures B26 and B27 are encoded. The B pictures B26 and B27 are encoded with only a forward moving vector Fw corresponding to the P picture P25.

In the stream placed after the edit point of the GOP1, an I picture I8 that has been changed from a P picture is used as a predictive reference picture. With a forward prediction using the I picture I8, a P picture P11 is encoded. The P picture P11 is used as a predictive reference picture. With a forward prediction using the P picture P11, a P picture P14 is encoded. An I picture I8 is used as a predictive reference picture. With only a backward moving vector, B pictures B6 and B7 are encoded. B pictures B9 and B10 are encoded with a bidirectional prediction that is a combination of a forward prediction using the I picture I8 as a predictive reference picture and a backward prediction using the P picture P11. In addition, B pictures B12 and B13 are encoded with a bidirectional prediction that is a combination of a forward prediction using the P picture P11 as a predictive reference picture and a backward prediction using the P picture P14 as a predictive reference picture.

Figure 4:
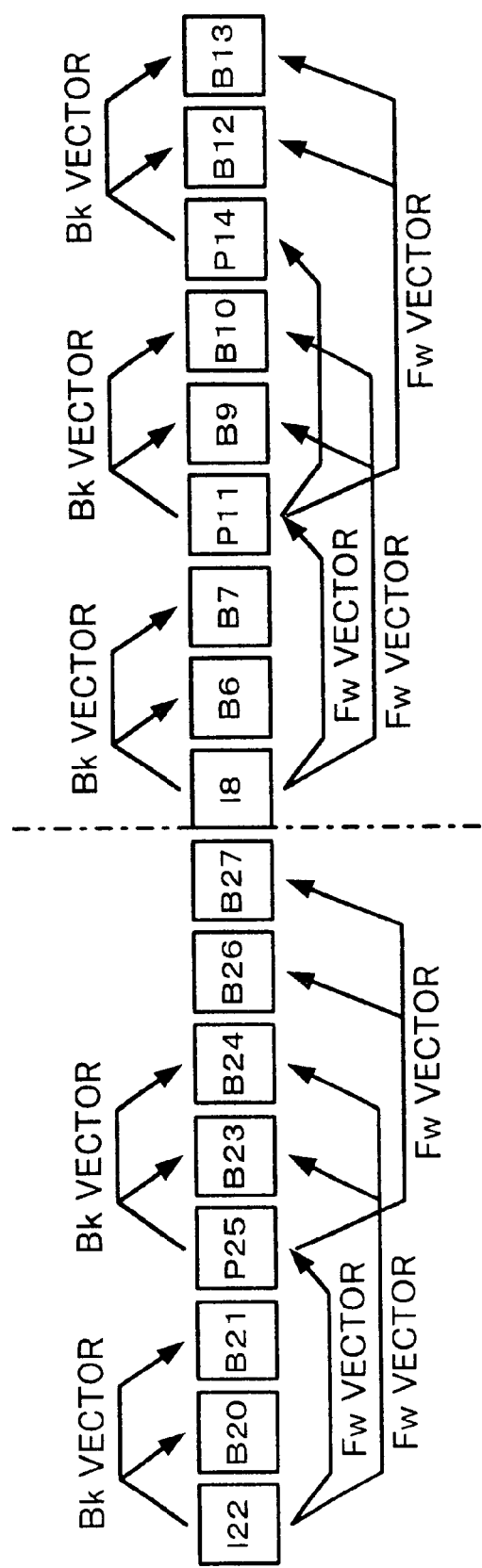
FIG. 4 is a timing chart for explaining a re-encoding process for use with the edit point processing method according to the embodiment of the present invention.

In the examples shown in FIG. 3 and 4, a forward vector using the P picture P25 as a predictive reference picture for the B pictures B6 and B7 is not used. In addition, a backward vector using the I picture as a predictive reference picture for the B pictures B26 and B27 is not used. This is because a picture placed before the edit point do not correlate to a picture placed after the edit point.

Next, a case that an edit point is not placed in the position shown in FIG. 3 will be described. When an edit point of the GOP1 is placed at a position before the I picture I22 (for example, between the B picture B21 and the I picture I22), if the stream placed after the edit point is discarded, the I picture I22 as a predictive reference picture of the B pictures B20 and B21 is lost. Thus, at step ST11, the GOP1 is decoded. At step ST12, pictures placed after the edit point are discarded. Thereafter, the second re-encoding process is performed. In other words, the first B picture B20 is changed to an I picture. Thereafter, the re-encoding process is performed. Thus, at step ST13, the other B picture B21 is re-encoded with only a forward moving vector Fw corresponding to the B picture B20 (changed to an I picture).

Moreover, in the process for the GOP1, when the edit point is placed after the I picture I22 and immediately before the B picture 23, the stream placed after the edit point is discarded (at step ST5). In other words, since the I picture I22 as a predictive reference picture of the B pictures B20 and B21 remains, it is not necessary to decode the GOP1.

Next, the case that an edit point of the GOP2 is placed in a different position from that shown in FIG. 3 will be described. When an edit point of the GOP2 is placed before the I picture I2 (for example, between the B picture B1 and the I picture I2), at step ST27, the B pictures B0 and B1 placed before the edit point are discarded. In this case, after the B pictures B0 and B1 are discarded, since the I picture I2 remains, it is not necessary to decode the GOP2.

In the above example, after the edit point process for the GOP1 is performed, the edit point process for the GOP2 is performed. It should be noted that after the edit point process for the GOP2 is performed, the edit point process for the GOP1 may be performed. As another alternative method, the edit point process for the GOP1 and the edit point process for the GOP2 may be processed simultaneously.

As described above, according to the embodiment of the present invention, when an edit point of the GOP1 of an earlier stream is placed before an I picture, the GOP1 is decoded. The first B picture is changed to an I picture. Thereafter, the re-encoding process is performed. When an edit point of the GOP2 of a later stream is placed before an I picture, the first P picture is changed to an I picture. Thereafter, the re-encoding process is performed. Thus, except for the picture type of the first P picture, the picture types of the other pictures of the stream placed before the edit point and the stream placed after the edit point are not changed. Thus, when the re-encoding process is performed, encoding information (moving vector and quantizing scale) used in the decoding process can be used. In addition, since a P picture that has a higher picture quality than that of a decoded picture of a B picture is used as an I picture, the deterioration of the picture quality in the re-encoding process can be suppressed.

Figure 5:
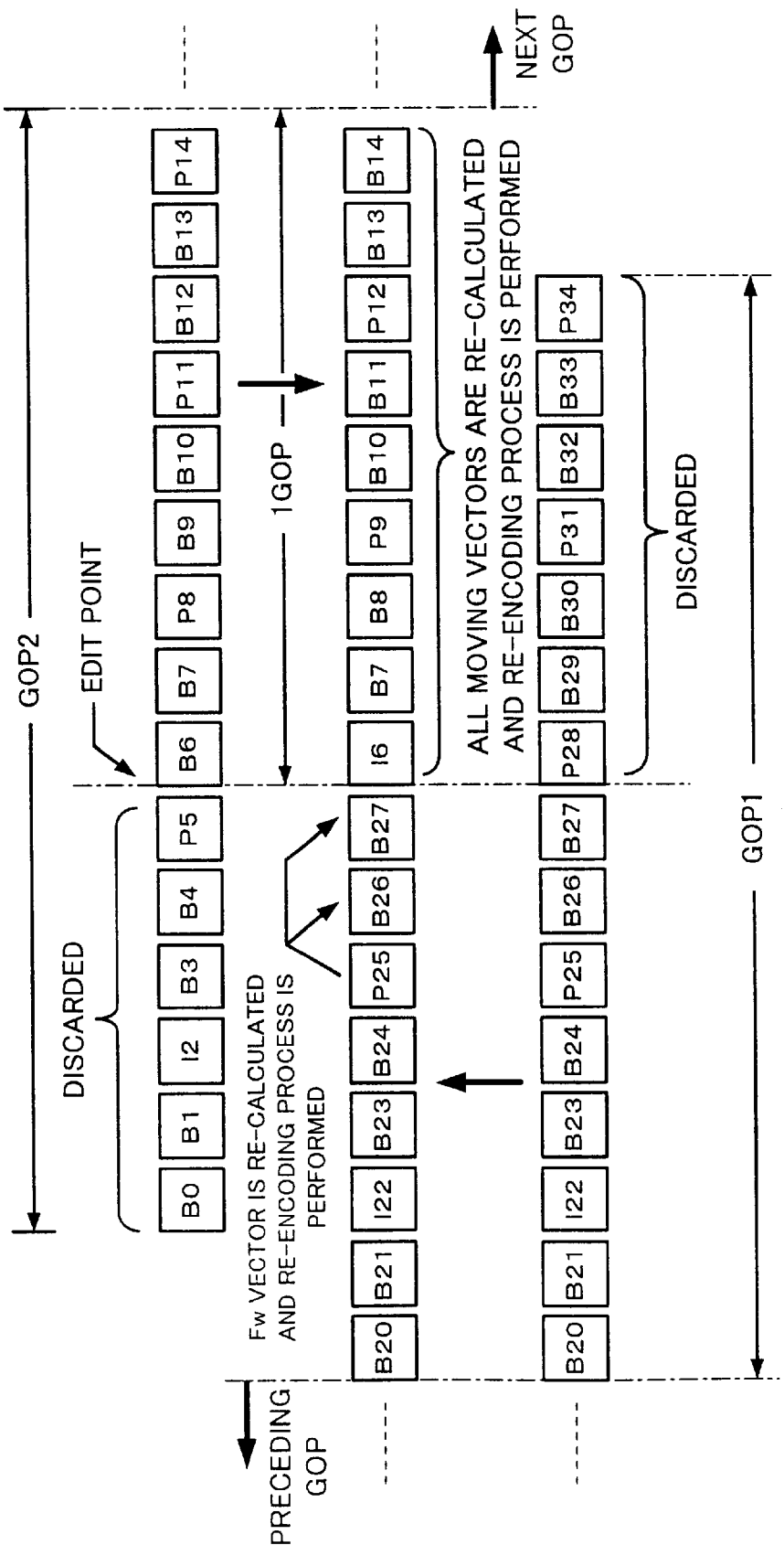
FIG. 5 is a flow chart for explaining another edit point processing method as a reference to explain the present invention.

For easily understanding of the concept of the present invention, with reference to FIG. 5, an edit point process that does not use picture type information of an original stream will be described. As with the case shown in FIG. 3, FIG. 5 shows a case that a GOP1 of is an earlier stream and a GOP2 of a later stream are switched over at edit points of the GOP1 and the GOP2. In this example, the number of pictures of each of the GOP1 and GOP2 is 15 (I=15). The interval of I or P pictures of each of the GOP1 and GOP2 is 3 (M=3).

Since a stream placed after the edit point of the GOP1 (a P picture P28 and later pictures) is not required, the stream is discarded. A stream placed before the edit point of the GOP2 (a P picture P5 and earlier pictures) is not required, the stream is discarded. At the edit point, the GOP1 is switched over to the GOP2. Thus, an edited stream represented as the middle portion of FIG. 5 is obtained.

When an edited signal is re-encoded, since B pictures B26 and B27 placed immediately before the edit point do not correlate with the later pictures, for backward inter-frame predictive macro blocks contained in the B pictures B26 and B27, a forward moving vector Fw is re-calculated. With only the obtained forward moving vector Fw, the re-encoding process is performed.

With respect to the GOP2, a stream from a B picture B6 placed immediately after the edit point to a P picture P14 placed immediately before the next GOP is processed as a new GOP. Thus, as shown in FIG. 5, pictures B6, P8, B9, P11, B12, and P14 are changed to pictures I6, B8, P9, B11, P12, and B14, respectively. Thereafter, the re-encoding process is performed. Thus, the number of pictures of the new GOP becomes 9 (N=9). The interval of I or P pictures of the new GOP becomes 3 (M=3). However, the number of pictures of the next GOP is 15 (N=15). The interval of I or P pictures of the next GOP is 3 (M=3). Thus, since predictive reference pictures are varied, to perform the re-encoding process, moving vectors for all pictures to be predicted should be re-calculated.

In the edit point process shown in FIG. 5, to re-encode an edited video signal, moving vectors for all pictures B7 to B14 placed after the I picture I6 should be obtained. Thus, the stream cannot be re-encoded with encoding information used in the decoding process for the stream. Consequently, the number of calculations necessary for obtaining moving vectors becomes large. In addition, since a decoded picture of a B picture (whose picture quality is worse than an I picture) is changed to an I picture and then the re-encoding process is performed, the picture quality largely deteriorates. However, according to the present invention, such a problem can be solved.

As shown in FIG. 3, according to the embodiment of the present invention, the P picture P8 is changed to the I picture I8 and then the re-encoding process is performed. In this process, to further reduce the number of calculations, the P picture P8 is changed to the I picture I8 in such a manner that the deterioration of the P picture P8 is minimum. Only the pictures B6, B7, B26, B27, and P8 are re-encoded. The other pictures of which picture types and predictive reference pictures are not changed are not re-encoded. In this method, it is important to re-encode the I picture I8 in such a manner that the difference between the P picture P8 and the I picture I8 becomes small. However, in this method, although the number of calculations is reduced, since the rate cannot be controlled, the rate per GOP in the vicinity of the edit point cannot be accurately kept constant.

When the rate per GOP (the amount of generated data) is constat, the number of bits used in a new GOP that has been edited is obtained by the following formula.

$$(P_{gop}/N) \times P_n$$

where N is the number of frames of the original GOP; $P_{gop}$ is the number of bits per GOP; $P_n$ is the number of frames of the new GOP ($P_n$=9 in the example shown in FIG. 3).

Thus, when the rate per GOP is strictly kept constant, since the number of frames of a new GOP decreases due to the editing process, the number of bits used for an I picture decreases.

Figure 6:
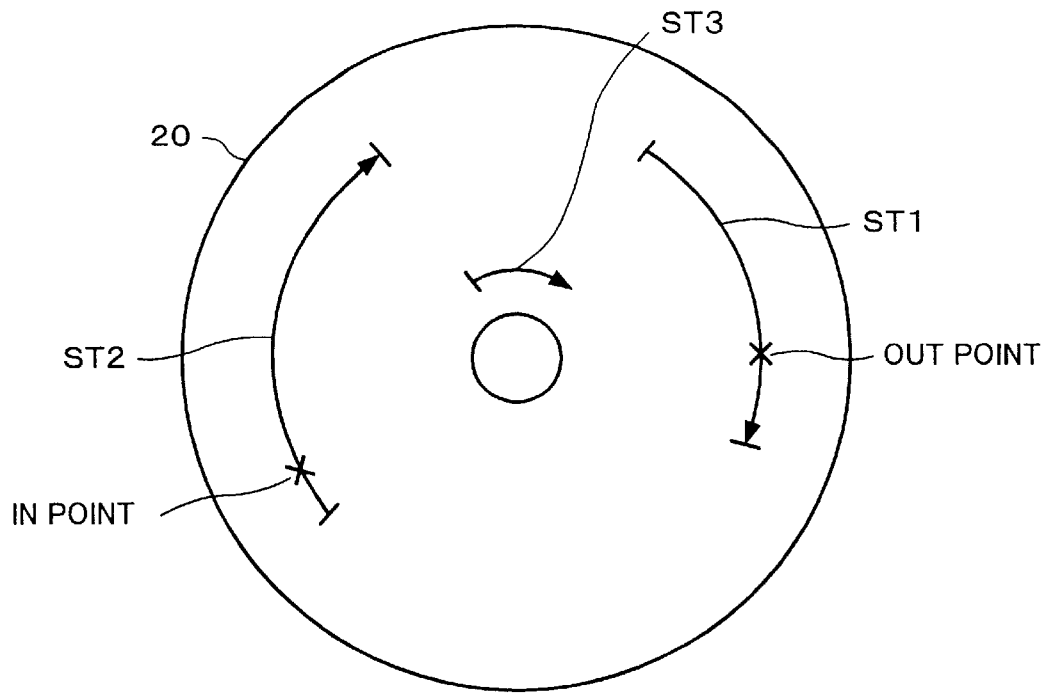
FIG. 6 is a schematic diagram showing an example of a record state on an optical disc for explaining the edit point process according to the present invention.

Next, a further practical example of the edit point process will be described. As shown in FIG. 6, it is assumed that MPEG bit streams ST1 and ST2 have been recorded on a rewritable optical disc 20. For example, an editing process of which an out point of a stream ST1 is connected to an in point of the stream ST2 is performed. A stream ST3 is generated by an edit point processing apparatus in such a manner that the vicinities of the in point and the out point are processed. The stream ST3 is recorded on the optical disc 20. When the streams ST1, ST3, and ST2 are successively reproduced from the optical disc 20, the streams that have been edited can be reproduced. Thus, streams that have been recorded are edited, unnecessary portions such as commercials can be removed.

The optical disc 20 is a random-accessible medium. As shown in FIG. 6, the original streams ST1 and ST2 and the stream ST3 that has been edited are recorded in a blank area. Thus, it is not necessary to successively record these streams. Link information is recorded in a management area disposed in the innermost peripheral area of the optical disc 20. For example, the link information represents that the stream ST3 is connected immediately after the stream ST1 and that the stream ST2 is connected immediately after the stream ST3. Thus, the streams that have been edited can be reproduced. The link information may be recorded in a stream. Alternatively, without the stream ST3, the streams ST1 and ST2 may be reproduced corresponding to a predetermined method for the edit point process.

Figure 7:
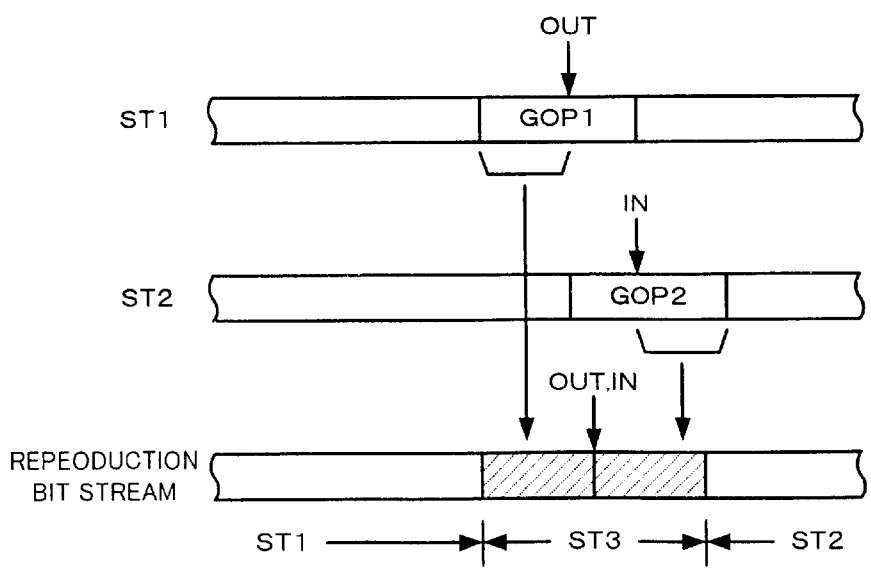
FIG. 7 is a schematic diagram for explaining an example of the edit point process according to the present invention.

FIG. 7 shows a sequence of processes. The edit point process is performed for the GOP1 of the stream ST1 is performed. The resultant stream is recorded as a stream placed immediately before the stream ST3. Next, the edit point process for the GOP2 of the stream ST2 is performed. The resultant stream is recorded as a stream placed immediately after the stream ST3. When necessary, a part of the stream ST1 placed immediately before the GOP1 and a part of the stream ST2 placed immediately after the GOP2 may be recorded as the stream ST3. As represented by the third portion shown in FIG. 7, when the streams ST1, ST3, and ST2 are successively reproduced, a reproduced bit stream of which the stream ST1 is switched over to the stream ST2 can be obtained.

FIGS. 6 and 7 show an example of the editing process. Thus, the present invention can be applied to another editing process. For example, a bit stream recorded on an optical disc may be switched over to an external bit stream. The switched bit stream may be recorded on the optical disc. In addition, a stream of which two bit streams have been switched over may be recorded on the optical disc.

Figure 8:
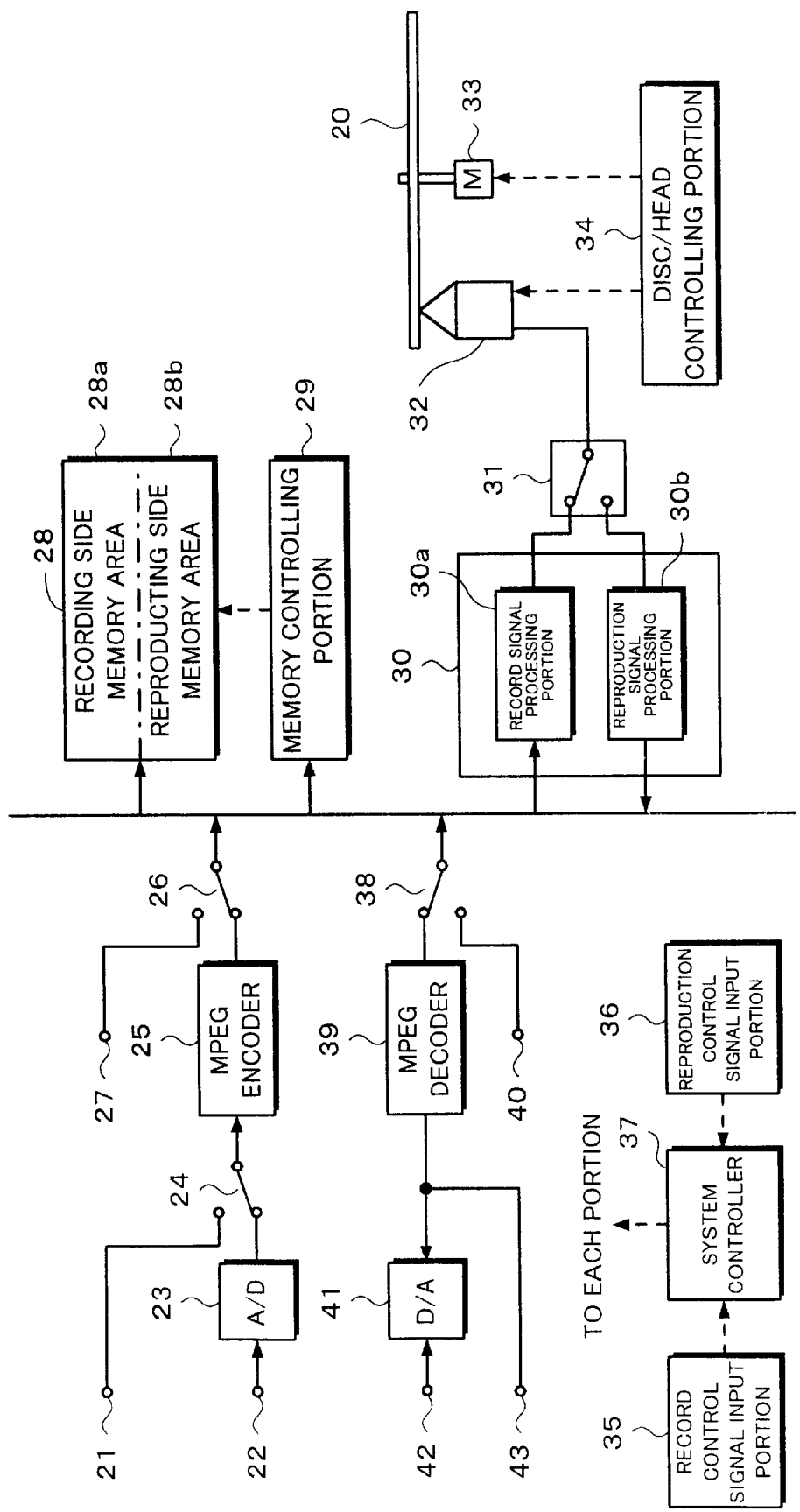
FIG. 8 is a block diagram showing an example of the structure of a disc recorder according to the present invention.

FIG. 8,is a block diagram showing an example of the structure of a disc recorder that records an MPEG bit stream to an optical disc 20 and reproduces an MPEG bit stream therefrom. In FIG. 8, a digital picture signal is directly supplied to an input terminal 21. The analog picture signal is a photographed picture signal, a broadcast picture signal received through an antenna, or the like. The analog picture signal is supplied to an A/D converting portion 23. The A/D converting portion 23 converts the analog picture signal into a digital picture signal. The digital picture signal received from the input terminal 21 or the digital picture signal received from the A/D converting portion 23 is selected by an input selecting switch 24. The selected digital picture signal is supplied to an MPEG encoder 25.

The MPEG encoder 25 compression-encodes the digital picture signal corresponding to the MPEG standard. An output signal of the MPEG encoder 25 is supplied to a first input terminal of a switch circuit 26. An MPEG bit stream is supplied from a terminal 27 to a second input terminal of the switch circuit 26. A bit stream received from the MPEG encoder 25 or an external bit stream is stored in a recording side buffer memory portion 28a of an integrated buffer memory 28 through a bus. An address of the integrated buffer memory 28 is designated by a memory controlling portion 29 controlled by a system controller 37.

The MPEG encoder 25 is composed of a motion predicting portion, a picture sequence changing portion, a subtracting portion, a DCT portion, a quantizing portion, a variable length code encoding portion, and a buffer memory. The motion predicting portion detects a moving vector. The subtracting portion forms a prediction error between an input picture signal and a local decoded picture signal. The DCT portion performs a DCT process for an output signal of the subtracting portion. The quantizing portion quantizes an output signal of the DCT portion. The variable length code encoding portion performs a variable length code encoding process for an output signal of the quantizing portion. The buffer memory outputs encoded data at a constant rate. The picture sequence changing portion changes the sequence of pictures corresponding to an encoding process. In other words, the picture sequence changing portion changes the sequence of pictures in such a manner that after I and P pictures are encoded, B pictures are encoded. The local decoding portion is composed of an inverse-quantizing portion, an inverse DCT portion, an adding portion, a frame memory, and a motion compensating portion. The motion compensating portion performs a forward prediction, a backward prediction, and a bidirectional prediction. When an intra-encoding process is performed, the subtracting portion simply passes data, rather than performs the subtracting process.

The bit stream stored in the recording side buffer memory portion 28a is supplied to the optical disc through a bus, a data processing portion 30, and a recording/reproducing mode selecting switch 31. The data processing portion 30 is composed of a record signal processing portion 30a and a reproduction signal processing portion 30b. The record signal processing portion 30a performs an error correction code encoding process, a digital modulating process, and so forth. The reproduction signal processing portion 30b performs an error correcting code decoding process, a digital demodulating process, and so forth.

The optical disc drive has an optical head 32 and a spindle motor 33. The optical head 32 radiates record laser light to the optical disc 20 so as to record a signal to the optical disc 20. In addition, the optical head 32 radiates reproduction laser light to the optical disc 20 so as to reproduce a signal from the optical disc 20. The spindle motor 33 rotates and drives the optical disc 20. The optical head 32 and the spindle motor 33 are controlled by a disc/head controlling portion 34. The optical head 32 records an output signal of the record signal processing portion 30a to the optical disc 20. The optical disc 20 is a rewritable disc such as an MO (magneto-optical) disc, a phase change type disc, or the like.

The system controller 37 controls the optical disc drive through the disc/head controlling portion 34. In addition, the system controller 37 controls the state of the optical disc drive. The system controller 37 outputs information received from the disc/head controlling portion 34 to the memory controlling portion 29 so as to control data supplied from the integrated buffer memory 28.

Next, the reproduction processing system will be described. A reproduced bit stream received from a reproducing side buffer memory portion 28b of the integrated buffer memory 28 is supplied to a switch circuit 38. The switch circuit 38 selectively outputs the reproduced bit stream to an MPEG decoder 39 or a terminal 40. The MPEG decoder 39 decodes the reproduced bit stream. The decoded picture signal is supplied to a D/A converting portion 41. The D/A converting portion 41 converts the decoded picture signal into an analog picture signal. The analog picture signal is obtained from an analog output terminal 42. In addition, the decoded digital picture signal is obtained from a digital output terminal 43.

The MPEG decoder 39 is a local decoding portion that is composed of a buffer memory, a variable length code decoding portion, an inverse DCT portion, an inverse quantizing portion, an adding portion, a picture sequence changing portion, a frame memory, and a motion compensating portion. The adding portion adds an output signal of the inverse quantizing portion and a local decoded output signal. When an intra-decoding process is performed, the adding portion simply passes data rather than performs the adding process. The picture sequence changing portion restores the decoded data received from the adding portion into the original picture sequence.

In the reproducing mode, the disc/head controlling portion 34 of the optical disc drive controls servo, head traveling, and so forth and supplies a reproduction signal to the reproducing side buffer memory portion 28b through the reproduction signal processing portion 30b of the data processing portion 30 and the bus. The reproducing side buffer memory portion 28b supplies the reproduced bit stream to the switch circuit 38 in such a manner that the writing operation and the reading operation of the reproduction signal are balanced. The bit stream selected by the switch circuit 38 is decoded by the MPEG decoder 39 or obtained from the output terminal 40. The decoded picture signal that is received from the MPEG decoder 39 is supplied to the D/A converting portion 41 or the output terminal 43. The D/A converting portion 41 converts the digital picture signal into an analog picture signal. The analog picture signal is obtained from the output terminal 42.

The above-described disc recorder is controlled by the integrated buffer memory 28 and the system controller 37. The integrated buffer memory 28 varies the assignment of a recording side storage area and a reproducing side storage area. The system controller 37 assigns a storage area of the integrated buffer memory 28 depending on whether the current mode is the recording mode or the reproducing mode. In other words, the storing areas of the reproducing side buffer memory portion 28a and the reproducing side buffer memory portion 28b are varied under the control of the system controller 37 through the memory controlling portion 29. For example, in the recording mode, the reproducing side buffer memory portion 28 uses all the storage area of the integrated buffer memory 28. In contrast, in the reproducing mode, the reproducing side buffer memory portion 28b uses all the storage area of the integrated buffer memory 28. In the simultaneous recording/ reproducing mode, the integrated buffer memory 28 may be equally shared by the recording side buffer memory portion 28a and the reproducing side buffer memory portion 28b.

Figure 9:
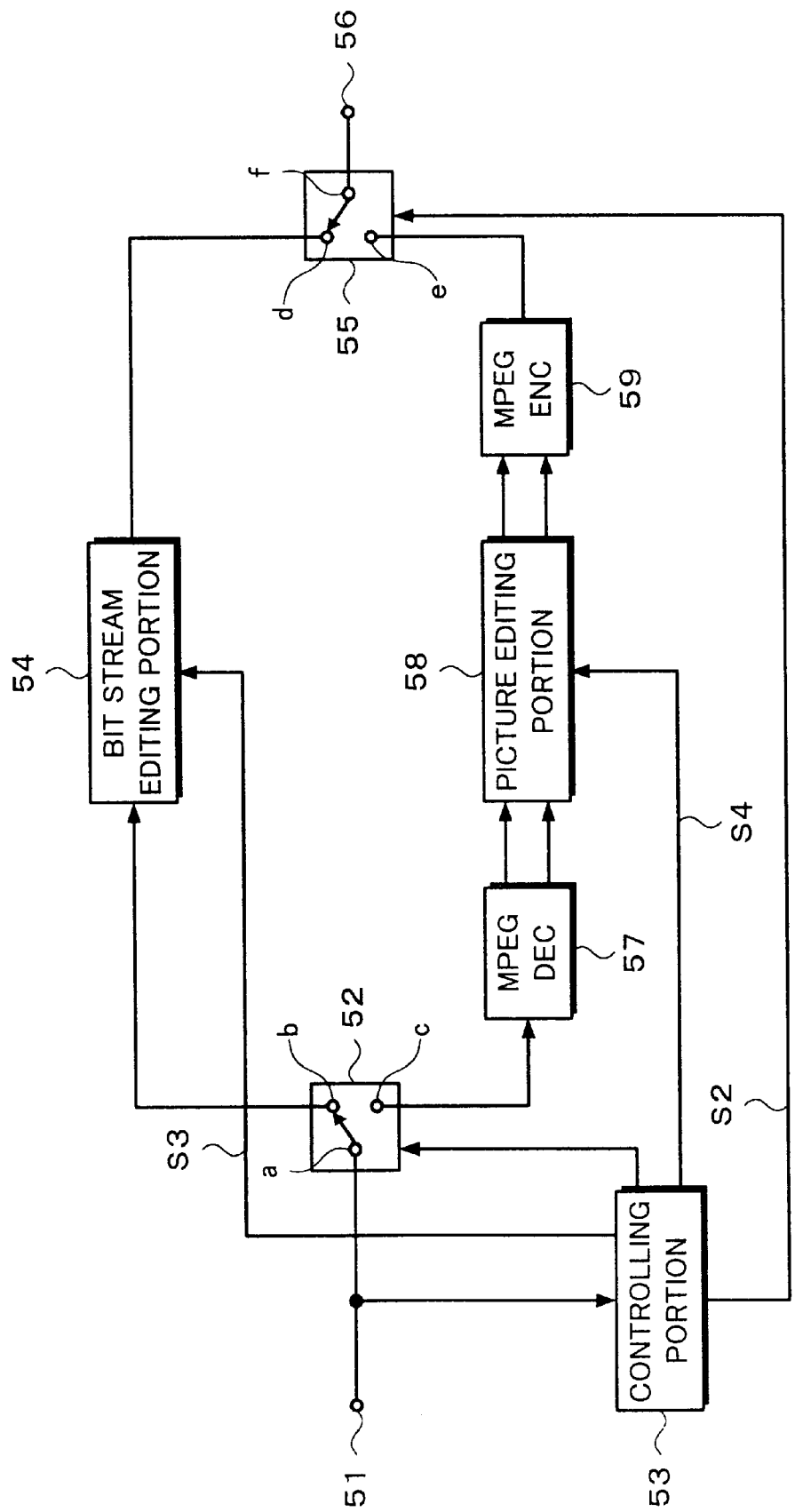
FIG. 9 is a block diagram showing the structure of an edit point processing apparatus according to an embodiment of the present invention.

Next, with reference to FIG. 9, an edit point processing apparatus according to an embodiment of the present invention will be described. The edit point processing apparatus is connected to the abovedescribed disc recorder and performs the edit point process according to the present invention. An MPEG bit stream that has been reproduced from the disc recorder and received from the output terminal 40 is supplied to an input terminal 51. Edit points (out point and in point) have been set to the input stream by a predetermined means. For example, information that represents the positions of edit points has been placed in a bit stream. Position information of edit points may be transmitted through a signal path that synchronizes with a bit stream.

The input bit stream is supplied to an input terminal a of a switch circuit 52 and a controlling portion 53. The controlling portion 53 performs the above-described edit point process (see FIGS. 1 and 2) with the edit point information and encoding information (picture type, moving vector, and quantizing scale) contained in the MPEG bit stream. In other words, the controlling portion 53 determines whether or not to decode the stream corresponding to the positions of the edit points and generates control signals S1 and S2 corresponding to the determined results.

The control signal S1 controls an input-side switch circuit 52. The control signal S2 controls an output-side switch circuit 55. When the controlling portion 53 has determined to decode the stream, the input stream is supplied to a bit stream editing portion 54 through the input terminal a and an output terminal b of the switch circuit 52. An output signal of the bit stream editing portion 54 is obtained from an output terminal 56 through an input terminal b and an output terminal f of the switch circuit 55.

When the controlling portion 53 has determined not to decode the bit stream, the input stream is supplied to an MPEG decoder 57 through the input terminal a and an output terminal c of the switch circuit 52. The MPEG decoder 57 is connected to a picture editing portion 58 that edits a picture signal. An edited signal that is output from the picture editing portion 58 is supplied to an MPEG encoder 59. The MPEG encoder 59 re-encodes a picture signal that has been edited. An output signal (a bit stream) of the MPEG encoder 59 is obtained from an output terminal 56 through an input terminal e and the output terminal f of the switch circuit 55.

As was described with reference to FIG. 1, it is determined whether or not to decode for example a GOP1 depending on the relation between the position of an edit point and an I picture (at step ST3) and whether or not the position of the edit point is placed immediately after an I/P picture (at step ST4). When it is not necessary to decode the GOP1, the stream placed after the edit point is discarded (at step ST5). The resultant bit stream is output (at step ST6). The bit stream editing portion 54 discards the bit stream corresponding to the control signal S3 received from the controlling portion 53.

When it is necessary to decode the GOP1, the MPEG decoder 57 decodes the bit stream (at step ST7, ST11, or ST14). The picture editing portion 58 receives the decoded signal from the MPEG decoder 57 and discards an unnecessary picture signal (at step ST8, ST12, or ST15). The MPEG encoder 59 performs the first, second, or third re-encoding process (at step ST9, ST13, or ST16). The controlling portion 53 supplies a control signal S4 corresponding to the edit point position information to the picture editing portion 58. The picture editing portion 58 discards the picture signal corresponding to the control signal.

The encoding information used in the decoding process of the MPEG decoder 57 is supplied to the picture editing portion 58. The picture editing portion 58 supplies the encoding information to the MPEG encoder 59. Thus, the picture editing portion 58 can change a picture type corresponding to the control signal S4. Consequently, the MPEG encoder 59 can reuse the encoding information. As with the GOP1, the GOP2 can be processed in the same manner.

In the case of the edit point process described with reference to FIGS. 6 and 7, the disc recorder reproduces the stream ST1 from the optical disc 20 and supplies a stream in the vicinity of the edit point (out point) of the stream ST1 to the input terminal 51 of the edit point processing apparatus. The editing point processing apparatus performs the process for the GOP1 containing the edit point represented by the flow chart shown in FIG. 1. The disc recorder records the resultant stream as an earlier portion of the stream ST3 to the optical disc 20.

Next, the disc recorder reproduces the stream ST2 from the optical disc 20 and supplies a stream in the vicinity of an edit point (in point) of the stream ST2 to the input terminal 51 of the edit point processing apparatus. The edit point processing apparatus performs the process for the GOP2 containing the edit point represented by the flow chart shown in FIG. 2. The disc recorder records the resultant stream as a later portion of the stream ST3 to the optical disc 20. The streams ST1, ST3, and ST2 are successively reproduced as edited streams from the optical disc 20 corresponding to link information recorded thereto.

In the above-described example, the disc recorder and the edit point processing apparatus are separately structured. However, the edit point processing apparatus may be built in the disc recorder. In such a case, the MPEG decoder and the MPEG encoder of the disc recorder can be used for the edit point process.

As described above, according to the embodiment of the present invention, the edit point process includes a decoding process and a re-encoding process. Alternatively, a hybrid edit point process as a combination of the above-described edit point process and another edit point process that does not include a decoding process and a re-encoding process may be performed.

Figure 10:
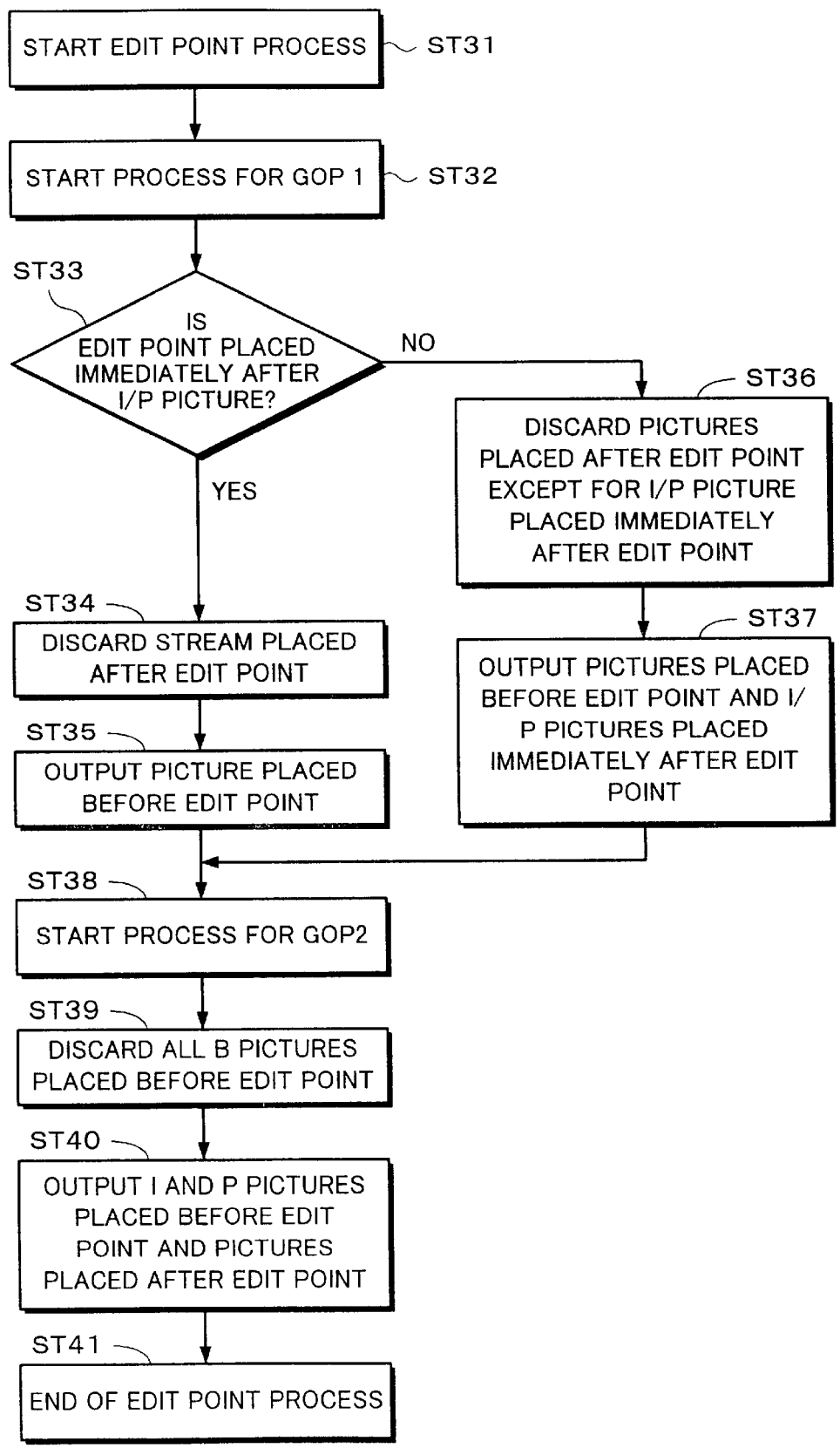
FIG. 10 is a flow chart for explaining an edit point processing method in a combination of the present invention.

Next, with reference to FIGS. 10 and 11, an example of an edit point process that does not include a decoding process and a re-encoding process will be described. FIG. 10 is a flow chart showing an edit point processing method. At step ST31, the edit point process is started. At step ST32, the process for a GOP (GOP1) of an earlier one of two bit streams to be connected is started. The GOP1 contains an edit point (out point).

At step ST33, it is determined whether or not the edit point of the GOP1 is placed immediately after an I or P picture. When the determined result at step ST33 is Yes (namely, the edit point is placed immediately after an I or P picture), the flow advances to step ST34. At step ST34, the bit stream placed after the edit point is discarded. At step ST35, the stream placed before the GOP1 is output as it is. In other words, since the stream placed before the edit point contains an I or P picture as a predictive reference picture, the portion that has been edited can be decoded without need to perform a special process.

When the determined result at step ST33 is No (namely, the edit point is not placed immediately after an I or P picture), the flow advances to step ST36. At step ST36, pictures that are placed after the edit point (except for an I or P picture placed immediately after the edit point) are discarded. At step ST37, pictures placed before the edit point and the I or P picture placed immediately after the edit point are output.

At step ST38, the process for a GOP (GOP2) of the later one of two streams that are connected is started. The GOP2 has an edit point (in point). At step ST39, all B pictures placed before the edit point are discarded. At step ST40, I and P pictures placed before the edit point and pictures placed after the edit point are output. At step ST41, the edit point process is completed. I and pictures placed before the edit point are not displayed, but should be stored.

Next, with reference to FIG. 11, the above-described edit point process will be more practically described. FIG. 11 shows an example of which a GOP1 of an earlier stream and a GOP2 of a later stream are switched over at edit points of the GOP1 and the GOP2. In each of the GOP1 and GOP2, the number of pictures is 15 (N=15) and the interval of predictive reference pictures (I or P pictures) is 3 (M=3). The sequence of pictures shown in FIG. 11 matches the sequence of reproduced pictures. The sequence of reproduced pictures matches the sequence of original pictures and the sequence of decoded pictures.

First of all, the edit point process for the GOP1 is performed. Since the edit point is not placed immediately after an I picture (I22) or a P picture (P25, P28, P31, or P34) (at step ST33), pictures placed immediately after the edit point except for the P picture P28 placed immediately after the edit point are output (at step ST36). The pictures placed before the edit point and the P picture P28 placed immediately after the edit point are output (at step ST37). The P picture P28 is stored because the B pictures B26 and B27 contained in the edited stream are decoded with the 20 P picture P28 as a predictive reference picture.

Next, the process for the GOP2 (B0 to P14) of the later stream is started (at step ST38). All B pictures B0, B1, and B4 placed before the edit point are discarded (at step ST39). The I picture I2 and the P picture P5 placed before the edit point and pictures placed after the edit point are output (at step ST40). Thereafter, the edit point process is completed (at step ST41). The I picture I2 and the P picture P5 are stored because the P picture P5 is decoded with the I picture I2 as a predictive reference picture and that the B pictures B6 and B7 contained in the edited stream are decoded with the decoded P5 as a predictive reference picture.

In the above-described edit point process, the stored I or P picture is required so as to decode a B picture contained in the edited stream. However, the stored I or P picture is not treated as a decoded picture of the edited stream. In other words, the stored I or P picture is not displayed as an edited picture signal. As an example, such an I or P picture is stored in a particular area of the record medium.

When the edit point of the GOP1 is immediately after an I or P picture, it is not necessary to store any picture. On the other hand, when the edit point is not placed immediately after an I or P picture, one I or P picture should be stored. In the case of the GOP2, the number of pictures to be stored depends on the position of the edit point. When the edit point is placed at a later position of the GOP2, the number of pictures to be stored increases. Up to four pictures (I2, P5, P8, and P11) other than the P picture P14 should be stored. Since up to five pictures are stored for one edit point, the redundancy on the record medium increases. In addition, the amount of data generated per GOP cannot be kept constant.

As described above, in the edit point processing method that does not include a decoding process and a re-encoding process, when a predictive reference picture (I or P picture) necessary for decoding an edited bit stream is stored, a decoding process for forming a new GOP and a re-encoding process for decoded data can be omitted. Thus, the picture deterioration due to the decoding process and the re-encoding process can be prevented. Thus, the hybrid editing method in a combination of the edit point process that does not include a decoding process and a re-encoding process and the edit point process according to the embodiment of the present invention can be performed.

As an example of the hybrid editing method, an earlier stream (GOP1) is processed by a method that does not include an editing process and a re-encoding process, whereas a later stream (GOP2) is processed by a method that includes an editing process and a re-encoding process. When the number of pictures placed after the edit point of the later GOP2 is large, the number of pictures that are not displayed, but stored becomes small. Thus, in this case, the method that does not include a decoding process and a re-encoding process is used. When the number of pictures placed after the edit point of the GOP2 is small, the number of pictures that are not displayed, but stored becomes large. Thus, in this case, the method that includes a decoding process and a re-encoding process is used. Consequently, the edit processing method is selected corresponding to the number of pictures that are not displayed, but stored. In addition, a hybrid editing method for selecting an editing method corresponding to the picture quality of a decoded picture of an edited stream can be used.

According to the present invention, when a bit stream in the vicinity of an edit point is decoded and re-encoded, since the interval of predictive reference pictures before the editing process matches that after the editing process, the number of calculations for obtaining moving vectors in the re-encoding process can be decreased. In addition, the picture deterioration due to the re-encoding process can be suppressed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture editing apparatus, comprising:

designating means for designating an edit point;

controlling means for causing a picture encoded as a predictive reference picture at least before the picture is edited to be encoded as a predictive reference picture after the picture is edited; and changing means for changing a predictive structure for a picture that is not the predictive reference picture placed before or after the edit point under the control of said controlling means.

2. The picture editing apparatus as set forth in claim 1, wherein said changing means includes predictive direction changing means for changing a predictive direction of a picture that is not the predictive reference picture.

3. The picture editing apparatus as set forth in claim 2, wherein said predictive direction changing means includes means for changing a bidirectional predictive encoded picture into an encoded picture with a forward moving vector when an out edit point is placed immediately after the bidirectional predictive encoded picture placed after a predictive reference picture in a GOP(Group Of Picture).

4. The picture editing apparatus as set forth in claim 2,
wherein said predictive direction changing means includes means for changing a bidirectional predictive encoded picture into an encoded picture with a forward moving vector from a predictive reference picture of a preceding GOP when an out edit point is placed immediately after the bidirectional predictive encoded picture placed before an intra-picture predictive encoded picture in a GOP.

5. The picture editing apparatus as set forth in claim 2,
wherein said predictive direction changing means includes means for changing a bidirectional predictive encoded picture into an encoded picture with a backward moving vector from a predictive reference picture p laced after the bidirectional predictive encoded picture when an in edit point is placed immediately before the bidirectional predictive encoded picture placed after an intra-picture predicted encoded picture in a GOP.

6. A picture editing method, comprising the steps of:
(a) designating an edit point;
(b) causing a picture encoded as a predictive reference picture at least before the picture is edited to be encoded as a predictive reference picture after the picture is edited; and
(c) changing a predictive structure for a picture that is not the predictive reference picture placed before or after the edit point under the control of step (b).

7. The picture editing method as set forth in claim 6,
wherein step (c) includes the step of:
(d) changing a predictive direction of a picture that is not the predictive reference picture.

8. The picture editing method as set forth in claim 7,
wherein step (d) includes the step of:
(e) changing a bidirectional predictive encoded picture into an encoded picture with a forward moving vector when an out edit point is placed immediately after the bidirectional predictive encoded picture placed after a predictive reference picture in a GOP (Group Of Picture).

9. The picture editing method as set forth in claim 7,
wherein step (d) includes the step of:
(f) changing a bidirectional predictive encoded picture into an encoded picture with a forward moving vector from a predictive reference picture of a preceding GOP when an out edit point is placed immediately after the bidirectional predictive encoded picture placed before an intra-picture predictive encoded picture in a GOP.

10. The picture editing method as set forth in claim 7,
wherein step (d) includes the step of:
(g) changing a bidirectional predictive encoded picture into an encoded picture with a backward moving vector from a predictive reference picture placed after the bidirectional predictive encoded picture when an in edit point is placed immediately before the bidirectional predictive encoded picture placed after an intra-picture predicted encoded picture in a GOP.

* * * * *